United States Patent
Hermann, Jr. et al.

(10) Patent No.: US 8,235,154 B2
(45) Date of Patent: Aug. 7, 2012

(54) VEHICLE DRIVE SYSTEM

(75) Inventors: William J. Hermann, Jr., Sealy, TX (US); Bass Blundell, Richmond, TX (US); Henry A. Mlcak, Sealy, TX (US)

(73) Assignee: Green Torch Solutions, LLC, Sealy, TX (US)

(*) Notice: Subject to any disclaimer, the term of this patent is extended or adjusted under 35 U.S.C. 154(b) by 380 days.

(21) Appl. No.: 12/552,426

(22) Filed: Sep. 2, 2009

(65) Prior Publication Data

US 2010/0147607 A1 Jun. 17, 2010

Related U.S. Application Data

(60) Provisional application No. 61/203,591, filed on Dec. 24, 2008, provisional application No. 61/190,887, filed on Sep. 3, 2008.

(51) Int. Cl.
*B60K 1/00* (2006.01)

(52) U.S. Cl. .................. 180/65.245; 180/65.31
(58) Field of Classification Search ............. 180/65.22, 180/65.245, 65.265, 65.275, 65.28, 65.285, 180/65.31
See application file for complete search history.

(56) References Cited

U.S. PATENT DOCUMENTS

| | | | |
|---|---|---|---|
| 7,152,705 B2* | 12/2006 | Alster et al. | 180/65.245 |
| 7,190,090 B2* | 3/2007 | Shi | 307/18 |
| 7,304,445 B2* | 12/2007 | Donnelly | 318/108 |

* cited by examiner

*Primary Examiner* — John Walters
(74) *Attorney, Agent, or Firm* — Strasburger & Price

(57) ABSTRACT

A vehicle drive system uses multi-fuel engines to provide mechanical energy as an electric generator. The electric generator provides electrical energy to an electric motor which in turn provides mechanical energy to the drive train of a vehicle. The electric generator also provides electric energy to storage batteries. Electrical energy may be provided from the storage batteries to the electric motor as needed.

5 Claims, 2 Drawing Sheets

VEHICLE DRIVE SYSTEM

CROSS REFERENCE TO RELATED APPLICATION

Figure 1:
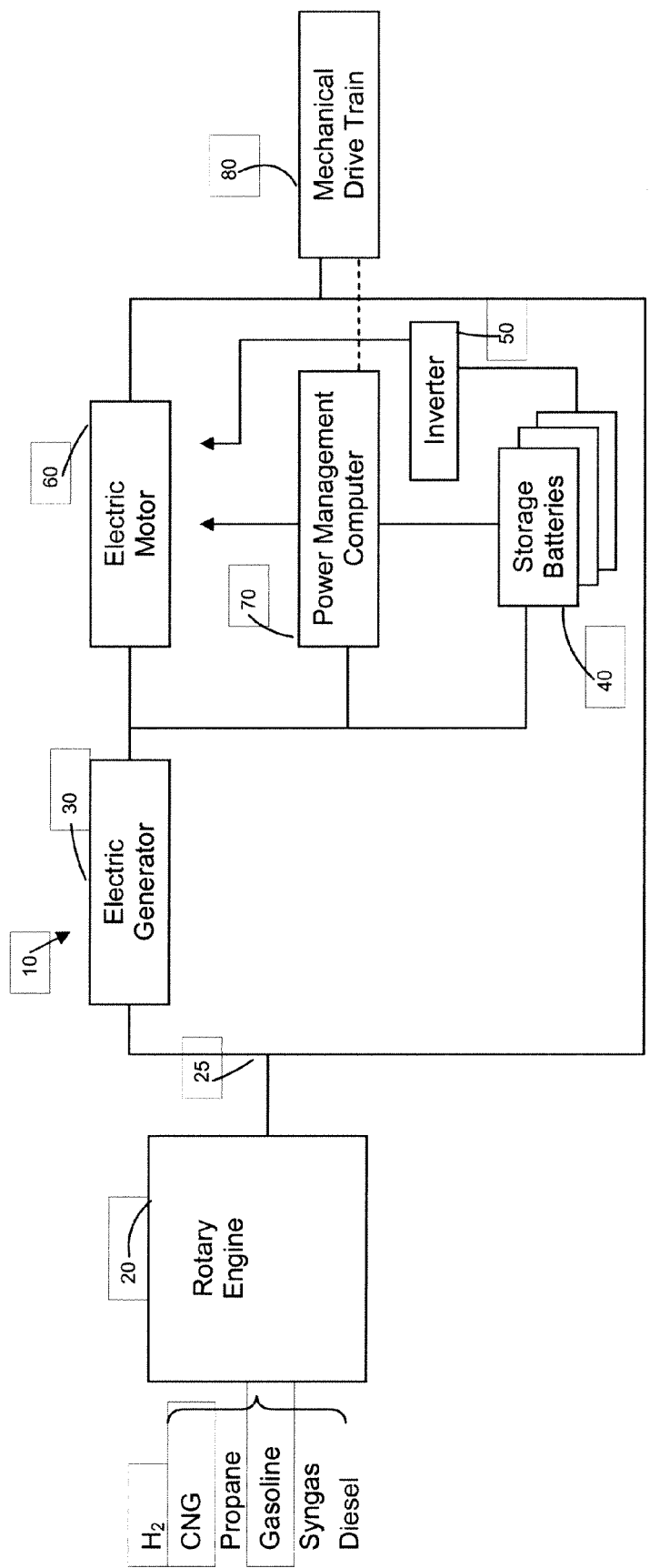

This application claims the benefit of Provisional U.S. Patent Application No. 61/190,887 filed Sep. 3, 2008 and Provisional U.S. Patent Application No. 61/203,591 filed Dec. 24, 2008.

STATEMENT REGARDING FEDERALLY FUNDED RESEARCH AND DEVELOPMENT

The invention described in this patent application was not the subject of federally sponsored research or development.

FIELD

The present invention pertains to drive systems for use in vehicles; more particularly, the present invention pertains to vehicular electro-mechanical drive systems.

BACKGROUND

In the past decade both the high price and the frequent price fluctuations of hydrocarbon fuels such as gasoline and diesel fuel have been frustrating and expensive for vehicle operators. In response to this frustration and expense, smaller vehicles such as the SmartCar® have appeared. Hybrid vehicle drive systems, such as the energy efficient electro-mechanical system found in the Toyota Prius® have become popular among some vehicle operators. Volkswagen has recently announced the testing of a prototype one passenger vehicle powered by an electro-mechanical drive system.

Those fearing an end to the supply of hydrocarbon fuels, such as gasoline or diesel fuel, have considered the use of alternative fuels or combinations of fuels in vehicle mounted fuel cells or in modified internal combustion vehicle engines. At the same time, most Americans are reluctant to downsize their vehicles. However, fuel costs and emission standards will produce a need for the use of smaller engines. Thus, more efficient fuels will be needed to continue to allow smaller engines to produce the torque needed to drive vehicles with an average weight of 1.5 tons.

No vehicle drive system is currently available which captures the advantages of both the energy efficient electro-mechanical vehicular drive systems and the use of multiple alternative fuels. Accordingly, there is a need in the art for a vehicular drive system which captures the advantages of an energy efficient electro-mechanical system and allows the utilization of multiple alternative fuels.

SUMMARY

A vehicular drive system includes an energy efficient electro-mechanical drive system and provides the ability to utilize multiple alternative fuels.

A first embodiment of the disclosed invention includes a rotary type internal combustion engine capable of transforming the stored energy in a variety of different fuels into mechanical energy. The rotary type internal combustion engine drives an electric generator. The electric generator provides electrical energy to an electric motor. Mechanical torque from the electric motor is then transmitted to the vehicle drive system. Also receiving electrical energy from the electric generator are storage batteries. The storage batteries may be used to provide additional electrical energy to the electric motor as needed.

A second embodiment of the disclosed invention includes two engines, each of which is configured to operate on multiple alternative fuels such as syngas, compressed natural gas and hydrogen as well as traditional fuels such as gasoline, and diesel fuel. One engine will enable obtaining optimum power from gaseous fuels, the other engine will optimize the power obtained from liquid fuels. Electric generators are mechanically connected to each of the two engines. The electrical energy from the electric generator is provided to an electric motor and to at least one rechargeable electrical storage battery. The electric motor provides the torque necessary to drive the vehicle. Energy from the at least one rechargeable electrical storage battery is provided to the electric motor as needed to drive the vehicle.

BRIEF DESCRIPTION OF THE DRAWING FIGURES

Figure 2:
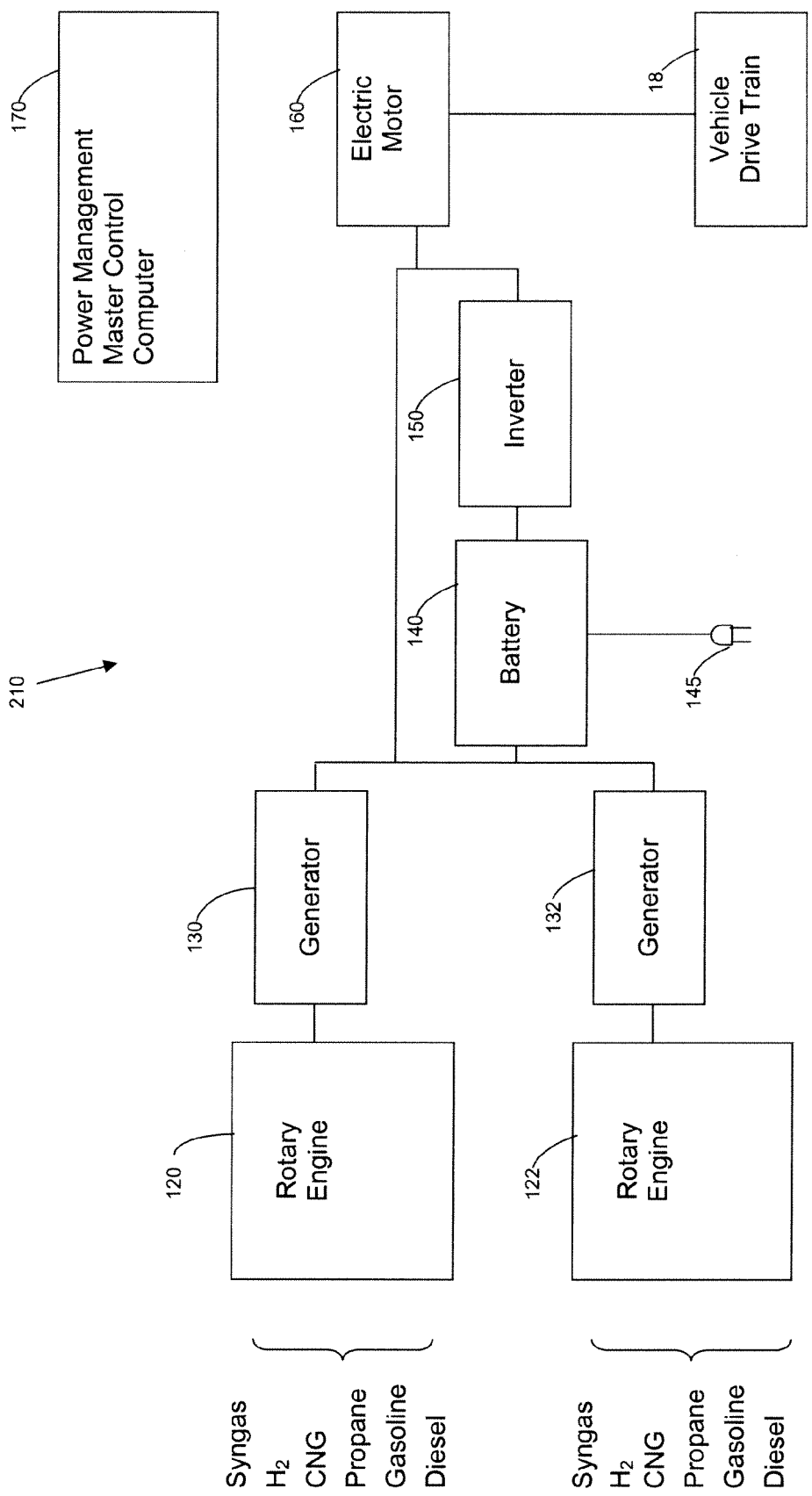

A still better understanding of the vehicle drive system of the present invention may be had by reference to the drawing figures wherein:

FIG. 1 is a schematic flow chart illustrating the flow of energy in the first embodiment of the disclosed invention; and FIG. 2 is a schematic flow chart illustrating the flow of energy in the second embodiment of the disclosed invention.

DESCRIPTION OF THE EMBODIMENTS

FIG. 1 is a flow chart illustrating the flow of energy in the first embodiment 10 of the disclosed invention. A rotary engine 20 producing about 50 to about 150 horsepower, such as that manufactured and marketed by Regi U.S., Inc. called RadMax™, is used to produce mechanical rotational drive power. The rotary engine 20 portion of the disclosed invention will replace the conventional internal combustion engine typically found in most vehicles. In the preferred embodiment, the RadMax™ radial engine will be seven times smaller than a conventional engine while producing the same power. Thus, a driver of a 1.5 ton vehicle will feel little difference in vehicle performance.

The vehicle chassis includes: an electric generator 30, at least one storage battery 40, an inverter 50, an electric motor 60 and a power management master control computer 70 such as provided by Azure Dynamics of Detroit, Mich.

The vehicle's rotary engine 20 will be able to operate independently on a variety of fuels to include: hydrogen, compressed natural gas, gasoline, propane and syngas.

The rotary engine will be mechanically coupled 25 to the electric generator 30 to provide the mechanical energy necessary to cause the electric generator 30 to produce electrical energy. The generated electrical energy may be used to drive the electric motor 60, or may send to at least one storage battery 40, or both. Motor speed and power output will be managed by a computer receiving multiple inputs to include the charge status of the batteries.

The electrical energy produced by the rotary engine 20/electric generator 30 combination will be sufficient to provide the needed electrical energy to enable the electric motor 60 to provide sufficient torque to the mechanical drive train 80 of the vehicle. Specifically, the electric motor 60 is mechanically connected to the transmission and any reduction gearing to propel the vehicle during normal start and stop driving conditions with a predetermined degree of margin. Additional electrical energy required by the electric motor 60 for higher power needed during transient driving conditions such as acceleration, uphill driving and high headwinds will be sensed by the power management master control computer 70. The additional electrical energy will be provided through an inverter 50 to the electric motor 60 using the electrical energy retained in the storage batteries 40. A similar drive system may be found in the vehicles produced by Azure Dynamics of Detroit, Mich.

As an example, the rotary engine, having approximately 125 to 150 horsepower, will be of sufficient size when coupled to an electric generator, to power a Ford model, F350 4×4 pick-up truck with a curb weight of 7000 lbs and a payload of 2000 lbs. The drive system of the present invention will replace the conventional 6.4 L diesel engine, which provides a maximum horsepower of 350 @ 3000 rpm, and a maximum torque of 650 ft-lb @ 2000 rpm. Propulsion systems for vehicles smaller than a Ford F350 truck may be accommodated by downsizing the components of the disclosed invention.

In an alternate mode of operation of the first embodiment 10, the power management master control computer 70 enables selection of a direct flow of mechanical energy to the mechanical drive train 80, from the electric motor 60 or a split flow of mechanical energy directed both to the vehicle drive train 80 and to the electric generator 30 for charging one or more storage batteries 40.

Thus, according to system 10, illustrated in FIG. 1, the following energy flow options to provide the necessary power to drive the vehicle are available:

- Mechanical energy from the rotary engine 20 directed to the electric generator 30 to produce sufficient electrical energy to power the electric motor 60 to provide mechanical energy to the vehicle's drive train 80;
- Mechanical energy from the rotary engine 20 directed to the electric generator 30 to produce sufficient electrical energy to power the electrical motor 60 and to provide electrical energy to maintain the electrical capacity of the storage batteries 40;
- Mechanical energy from the rotary engine 20 directed to the electric generator 30 to produce part of the electrical energy needed by the electric motor 60. The remaining portion of the electrical energy needed by electric motor 60 is provided by the storage battery 40 to produce sufficient mechanical energy to the vehicle drive 80 train to operate the vehicle as required by the driver.

In the preferred embodiment shown in FIG. 2, the same reference numbers have been used to refer to same major components as in the first embodiment but for the use of the numeral 1 in the hundreds place. Two medium sized rotary internal combustion engines 120, 122 each producing about 50 to about 150 horsepower, such as that manufactured and marketed by Regi U.S., Inc., called RadMax™, are used to produce rotational drive power. Each rotary internal combustion engine is configured to operate on available fuels such as syngas, $H_2$, compressed national gas (CNG) and propane. Attached to each engine is an electrical generator 130, 132 for transforming mechanical energy from the engines 120, 122 into electrical energy.

The vehicle chassis includes: at least one rechargeable storage battery 140, an inverter 150, an electric motor 160 and a power management master control computer 170 such as provided by Azure Dynamics of Detroit, Mich.

The generated electrical energy from each generator 130, 132 may be used to drive the electric motor 160, or may be used to recharge the one or more storage batteries 140, or both.

The electrical energy produced by each rotary engine electric generator combination will be sufficient to provide the needed electrical energy to enable the electric motor 160 to provide sufficient mechanical energy to the vehicle drive train 180, specifically the transmission and reduction gear, to propel the vehicle at normal start and stop driving conditions with some degree of margin. Additional electrical energy required by the electric motor 160 for higher power transient driving conditions such as acceleration, uphill driving and high headwinds will be sensed by the power management master control computer 170. The additional electrical energy will be provided by the one or more storage batteries 140 through an inverter 150 to the electric motor 160 using the electrical energy retained in the one or more storage batteries 140 or by the second engine.

The power management master control computer 170 which is connected to all components will assure balanced operation of the entire system shown in FIG. 2. For example, the power management master control computer 170 will assure that electrical energy stored in the one or more storage batteries 140 is sufficient to propel the vehicle up to 50 miles. After 50 miles the power management master control computer 170 will select the most efficient engine of the two rotary engines 120, 122. The engine selected by the power management master control computer 170 will operate so that the mechanical energy produced or the engine operable on the fuel available can be transformed into electrical energy by the attached generator 130, 132. This electrical energy will be used to recharge the one or more storage batteries 140 to enable continued operation of the vehicle. Fuel flow to the operating engine will be governed by the power management master control computer 170 to assure that the mechanical energy produced is sufficient to meet the electrical energy demands of the vehicle. In addition, the power management master control computer will monitor system operation and provide an alert if a portion of the system shown in FIG. 2 is not operating properly.

If additional operating torque is needed, such as when the vehicle is being driven uphill, the power management master control computer 170 will sense this need and provide the additional energy needed from either the storage battery or from operation of one or both engines.

After operation, the one or more storage battery 140 may be charged using available electrical energy 145 available in a user's garage or at a special charging station should the vehicle operator stop somewhere during a trip.

While the present invention has been described in terms of a preferred an alternate embodiment, those of ordinary skill in the art will recognize that modifications may be made to the disclosed system without departing from the scope of the invention. Such modifications shall fall within the scope and meaning of the appended claims.

What is claimed:
1. A drive system for a vehicle comprising:
   a first rotary-type internal combustion engine, wherein said first rotary-type internal combustion engine is optimized to operate on a first fuel;
   a first electric generator mechanically connected to said first rotary-type internal combustion engine, wherein said first electric generator is configured to produce electrical energy;
   a second rotary-type internal combustion engine, wherein said second rotary-type internal combustion engine is optimized to operate on a second fuel different from the first fuel;

a second electric generator mechanically connected to said second rotary-type internal combustion engine, wherein said second electric generator is configured to produce electrical energy;

a rechargeable electrical energy storage battery connected to said first electric generator and said second electric generator, wherein said rechargeable electrical energy storage battery is configured to selectively store the electrical energy produced by said first electric generator and by said second electric generator as directed by a power management master control computer;

an electric motor electrically connected to said first electric generator, said second electric generator, and said rechargeable electrical energy storage battery;

a mechanical drive train electrically connected to said electric motor configured to propel the vehicle;

wherein said electrical energy produced by said first rotary-type internal combustion engine and said first electric generator is independently sufficient to power said electric motor and propel the vehicle, wherein said electrical energy produced by said second rotary-type internal combustion engine and said second electric generator is independently sufficient to power said electric motor and propel the vehicle, wherein said power management master control computer selects one of said first rotary-type internal combustion engine or said second rotary-type internal combustion engine for usage to optimize energy efficiency under an operating condition of the vehicle.

2. The drive system as defined in claim 1, wherein each of said first rotary-type internal combustion engine and said second rotary-type internal combustion engine will operate on one or more fuels selected from a group including but not limited to:

gasoline;

syngas;

propane;

liquefied or compressed natural gas; and hydrogen.

3. The drive system as defined in claim 1, wherein said first rotary-type internal combustion engine operates on gaseous fuels and said second rotary-type internal combustion engine operates on liquid fuels.

4. The drive system as defined in claim 3, wherein each of said first rotary-type internal combustion engine and said second rotary-type internal combustion engine produces 50 to 150 horsepower.

5. The drive system as defined in claim 3, wherein said power management master control computer is coupled to the electric motor for sensing acceleration.

* * * * *